US012693451B2

(12) United States Patent
Nishio et al.

(10) Patent No.: US 12,693,451 B2
(45) Date of Patent: *Jul. 28, 2026

(54) METHOD OF PRODUCING MOLD FOR MICROLENS ARRAY THROUGH CUTTING

(71) Applicant: NALUX CO., LTD., Osaka (JP)

(72) Inventors: Yukinobu Nishio, Osaka (JP); Toshiki Hamatani, Osaka (JP); Tomohito Kuwagaito, Osaka (JP)

(73) Assignee: NALUX CO., LTD., Osaka (JP)

( * ) Notice: Subject to any disclaimer, the term of this patent is extended or adjusted under 35 U.S.C. 154(b) by 441 days.

This patent is subject to a terminal disclaimer.

(21) Appl. No.: 18/229,409

(22) Filed: Aug. 2, 2023

(65) Prior Publication Data

US 2023/0417957 A1 Dec. 28, 2023

Related U.S. Application Data

(63) Continuation-in-part of application No. PCT/JP2022/007560, filed on Feb. 24, 2022.

(Continued)

(51) Int. Cl.
| | |
|---|---|
| *B29D 11/00* | (2006.01) |
| *B29C 33/38* | (2006.01) |
| *G02B 3/00* | (2006.01) |

(52) U.S. Cl.
CPC ........ *G02B 3/0031* (2013.01); *B29C 33/3842* (2013.01); *B29D 11/0048* (2013.01); *B29D 11/00365* (2013.01)

(58) Field of Classification Search
CPC .... G02B 3/0031; G02B 3/00; B29C 33/3842; B29C 33/38; B29C 33/42; B29D 11/0048;

(Continued)

(56) References Cited

U.S. PATENT DOCUMENTS

| | | | | |
|---|---|---|---|---|
| 4,647,261 A | * | 3/1987 | Schaffner | B29C 37/02 408/180 |
| 5,195,407 A | * | 3/1993 | Takeno | B24B 13/046 82/12 |

(Continued)

FOREIGN PATENT DOCUMENTS

| | | | | | |
|---|---|---|---|---|---|
| JP | H0663810 A | * | 3/1994 | | |
| JP | H09505534 A | * | 6/1997 | | B29C 33/38 |

(Continued)

OTHER PUBLICATIONS

International Search Report and Written Opinion dated Aug. 29, 2023, corresponding to International Patent Application No. PCT/JP2023/027546.

(Continued)

*Primary Examiner* — Robert F Long
(74) *Attorney, Agent, or Firm* — SQUIRE PATTON BOGGS (US) LLP

(57) ABSTRACT

A method of producing a mold for a microlens array with a cutting tool rotating around a rotation axis, microlenses having the substantially same shapes. A z-axis of an (x, y, z) coordinate system is in the direction of the central axis of a surface of the mold. The method includes the steps of cutting a surface of the mold while each of angle $\theta$ between the rotation axis of the cutting tool and a straight line passing through a point on the rotation axis and parallel to the z-axis and angle $\varphi$ of a plane containing the rotation axis and the straight line around the straight line is kept constant; and cutting the plural surfaces while the values of angle $\theta$ and angle $\varphi$ are determined such that a variance of the values of at least one of angle $\theta$ and angle $\varphi$ is greater than a predetermined value.

9 Claims, 24 Drawing Sheets

100

Related U.S. Application Data

(60) Provisional application No. 63/153,435, filed on Feb. 25, 2021.

(58) Field of Classification Search
CPC ........ B29D 11/00365; B29D 11/00298; B29D 11/00932
USPC ..... 408/1, 8–15, 67, 76, 115, 145, 207, 230, 408/224
See application file for complete search history.

(56) References Cited

U.S. PATENT DOCUMENTS

| | | | | |
|---|---|---|---|---|
| 10,493,651 | B1 * | 12/2019 | Farris | B27C 7/06 |
| 2002/0060857 | A1 * | 5/2002 | Hosoe | G02B 5/1895 |
| | | | | 359/719 |
| 2002/0143435 | A1 * | 10/2002 | Terada | B23K 26/103 |
| | | | | 700/245 |
| 2003/0043343 | A1 * | 3/2003 | Diehl | B23C 3/023 |
| | | | | 351/159.75 |
| 2011/0027032 | A1 | 2/2011 | Keller et al. | |
| 2012/0182628 | A1 * | 7/2012 | Ishii | G02B 5/1895 |
| | | | | 264/2.5 |
| 2016/0047949 | A1 | 2/2016 | Keller et al. | |
| 2020/0246954 | A1 * | 8/2020 | Yamada | B25D 17/11 |
| 2021/0299915 | A1 * | 9/2021 | Shamoto | B29C 33/424 |
| 2023/0201931 | A1 * | 6/2023 | Daniels | B23Q 23/00 |
| | | | | 408/1 R |
| 2025/0138224 | A1 * | 5/2025 | Hamatani | G02B 3/0025 |

FOREIGN PATENT DOCUMENTS

| | | | | | |
|---|---|---|---|---|---|
| JP | 2002326230 | A | * | 11/2002 | |
| JP | 2005230974 | A | | 9/2005 | |
| JP | 2006-289566 | A | | 10/2006 | |
| JP | 2008254156 | A | | 10/2008 | |
| JP | 4326176 | B2 | * | 9/2009 | B29D 11/00278 |
| JP | 2011251383 | A | * | 12/2011 | B23B 5/00 |
| JP | 2012-101291 | A | | 5/2012 | |
| JP | WO2013140882 | A1 | * | 8/2015 | B29C 33/424 |
| JP | 2018043444 | A | | 3/2018 | |
| WO | 2010/033805 | A2 | | 3/2010 | |

OTHER PUBLICATIONS

International Search Report and Written Opinion dated May 10, 2022 corresponding to International Patent Application No. PCT/JP2022/007560.

Office Action dated Sep. 30, 2022 corresponding to Japanese Patent Application No. 2022-539364.

* cited by examiner

100

115

C

O $\Delta(\alpha)$ $\alpha$

C'

RADIUS-(ERROR IN RADIUS $\Delta(\alpha)$)

CUTTING TOOL

O $\alpha$          $\alpha$

M

S'

210

METHOD OF PRODUCING MOLD FOR MICROLENS ARRAY THROUGH CUTTING

CROSS REFERENCE TO RELATED APPLICATION

This is a Continuation-in-Part of International Patent Application No. PCT/JP2022/007560 filed Feb. 24, 2022, which designates the U.S. and which claims priority from U.S. Provisional Patent Application No. 63/153,435, dated Feb. 25, 2021. The contents of these applications are hereby incorporated by reference.

TECHNICAL FIELD

The present invention relates to a method of producing a mold for a microlens array through cutting.

BACKGROUND ART

When a mold for a microlens array is produced through cutting with a machine such as a multi-axis machine, plural surfaces of the mold corresponding to plural microlens surfaces of the microlens array are machined one after another (Patent document 1, for example). Accordingly, when the number of microlenses is great, wear of a cutting tool of the machine becomes relatively great. Form errors of the surfaces of a mold due to wear of a cutting tool have a great influence on optical performance of a microlens array. When the plural surfaces of a mold corresponding to the plural microlens surfaces of a microlens array are machined one after another, wear at specific portions of the cutting tool of the machine tends to become relatively great and form errors at specific portions of the plural surfaces of the mold corresponding to the specific portions of the cutting tool become relatively great. As a result, when the microlens array is used as an optical element for enlarging divergence of a light beam by refraction, for example, a change in illuminance at specific positions on a surface illuminated using the microlens array tends to become relatively great, the change in illuminance being an accumulation of a change in illuminance due to form errors at specific portions of each microlens surface.

For the above-described reason, conventional methods of producing a mold for a microlens array through cutting cannot sufficiently resolve problems accompanied by downsizing of microlenses and upsizing of microlens arrays. In other words, a method of producing a mold for a high optical performance microlens array through cutting, the microlens array having a large area and a great number of fine microlenses, has not been developed. Accordingly, there is a need for a method of producing a mold for a high optical performance microlens array through cutting, the microlens array having a large area and a great number of fine microlenses.

PRIOR ART DOCUMENTS

Patent Documents

Patent document 1: JP2018043444

The object of the present invention is to provide a method of producing a mold for a high optical performance microlens array through cutting, the microlens array having a large area and a great number of fine microlenses.

SUMMARY OF THE INVENTION

A method of producing a mold for a microlens array according to a first aspect of the present invention is a method of producing a mold for a microlens array provided with plural microlenses through cutting with a cutting tool that rotates around a rotation axis, wherein the plural microlenses have optical axes in the same direction and substantially same shapes and the mold has plural surfaces corresponding to surfaces of the plural microlenses. The method includes the steps of cutting a surface of the mold, the surface corresponding to a microlens surface and having the central axis corresponding to the optical axis of the microlens, while each of a value of angle $\theta$ between the rotation axis of the cutting tool and a straight line passing through a point on the rotation axis and parallel to the central axis of the surface and a value of angle $\phi$ of a plane containing the rotation axis of the cutting tool and the straight line around the straight line is kept constant in a certain area; and cutting the plural surfaces of the mold corresponding to the plural microlens surfaces while the values of angle $\theta$ and angle $\phi$ for the plural surfaces of the mold are determined such that a variance of the values of at least one of angle $\theta$ and angle $\phi$ for the plural surfaces of the mold is greater than a predetermined value to sufficiently reduce a change in illuminance on a surface illuminated using a microlens array produced using the mold.

According to the present aspect, in the step of cutting the plural surfaces of the mold corresponding to the plural microlens surfaces, the values of angle $\theta$ and angle $\phi$ for the plural surfaces of the mold are determined such that a variance of values of at least one of angle $\theta$ and angle $\phi$ for the plural surfaces of the mold is greater than a predetermined value to sufficiently reduce a change in illuminance on a surface illuminated using a microlens array produced using the mold. As a result, a change in illuminance on a surface illuminated using a microlens array produced using the mold, the change being caused by form errors on the surfaces of the mold can be reduced. Accordingly, by the method according to the present aspect, a mold for a high optical performance microlens array, the microlens array having a large area and a great number of fine microlenses can be produced through cutting.

In the method of producing a mold for a microlens array according to a first embodiment of the first aspect of the present invention, cutting is carried out along a tool path that is continuous and does not intersect with itself.

In the method of producing a mold for a microlens array according to a second embodiment of the first aspect of the present invention, in the step of cutting the plural surfaces of the mold corresponding to the plural microlens surfaces, the values of angle $\theta$ for the plural surfaces of the mold are set to a constant that is not zero or to plural constants that include at least one constant that is not zero and the values of angle $\phi$ for the plural surfaces of the mold are distributed such that a variance of the values is greater than a predetermined value.

According to the present embodiment, the values of angle $\theta$ for the plural surfaces of the mold are set to a constant that is not zero or to plural constants that include at least one constant that is not zero and therefore a tool path can be easily determined.

In the method of producing a mold for a microlens array according to a third embodiment of the first aspect of the present invention, the values of at least one of angle $\theta$ and angle $\phi$ for N adjacent surfaces of the mold corresponding to N adjacent microlens surfaces are distributed such that a variance of the values is greater than a predetermined value where N is a natural number equal to or smaller than 10.

According to the present embodiment, a distribution of the values of at least one of angle $\theta$ and angle $\phi$ can be determined such that the distribution is appropriate for an incident beam that enters any portion of the microlens array.

In the method of producing a mold for a microlens array according to a fourth embodiment of the first aspect of the present invention, the value of angle $\theta$ is equal to or greater than 3 degrees and equal to or smaller than 15 degrees.

In the method of producing a mold for a microlens array according to a fifth embodiment of the first aspect of the present invention, a five-axis machine provided with three linear-motion axes and two rotation axes is employed for cutting, the cutting tool is made to travel by the three linear-motion axes and angle $\theta$ and angle $\phi$ are determined by the two rotation axes.

According to the present embodiment, a mold for a microlens array can be easily produced using a five-axis machine.

In the method of producing a mold for a microlens array according to a sixth embodiment of the first aspect of the present invention, in the step of cutting the plural surfaces of the mold corresponding to the plural microlens surfaces, the values of at least one of angle $\theta$ and angle $\phi$ for the plural surfaces of the mold are distributed uniformly in a certain range or in respective certain ranges.

In the method of producing a mold for a microlens array according to a seventh embodiment of the first aspect of the present invention, in the step of cutting a surface of the mold, the value of angle $\theta$ is kept constant in the area where a distance between a position of the cutting point and the central axis of the surface is equal to or smaller than 30 percent of the distance the central axis and the periphery of the surface and the value of angle $\theta$ is smaller than the constant value at the periphery of the surface.

According to the present embodiment, a contact between the side of the cutting tool and the periphery of the surface can be avoided.

A method of producing a microlens array according to a second aspect of the present invention uses a mold produced by the method according to the first aspect of the present invention.

By the method according to the present aspect, a high optical performance microlens array having a large area and a great number of fine microlenses can be produced.

DESCRIPTION OF EMBODIMENTS

Figure 1:
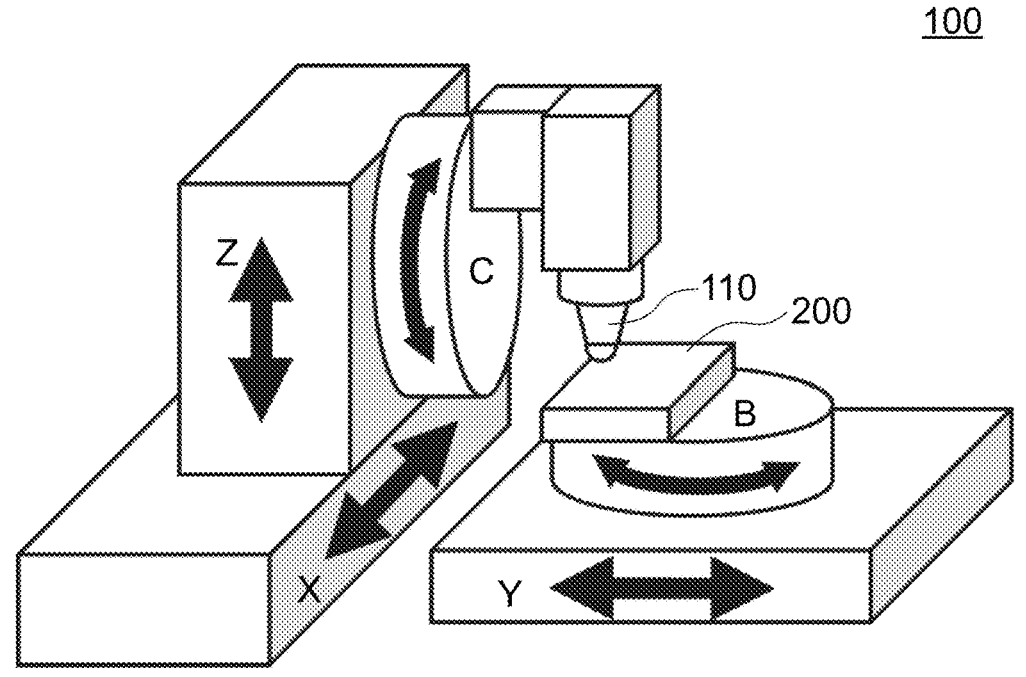
FIG. 1 shows a 5-axis machine as an example of a machine used for a cutting method according to the present invention.

FIG. 1 shows a 5-axis machine 100 as an example of a machine used for a method according to the present invention. The 5-axis machine 100 is provided with three linear-motion axes (X, Y, Z) and two rotation axes (B, C). A work piece 200 is cut by a cutting tool 110. The cutting tool 110 is a ball end mill, for example.

Figure 2:
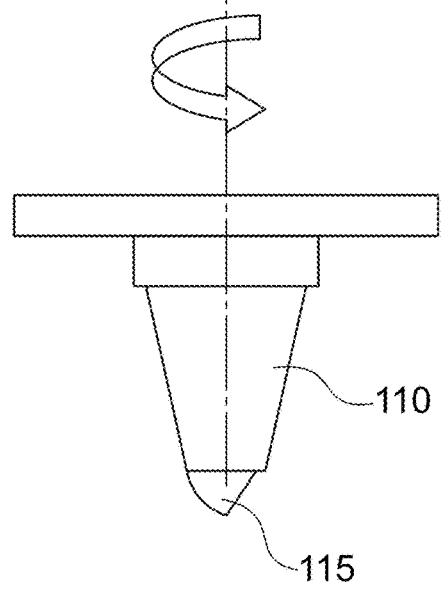
FIG. 2 shows the cutting tool.

FIG. 2 shows the cutting tool 110. The cutting tool 110 is provided with a cutting blade 115 and rotates around its rotation axis to cut the work piece 200. The contour of the cutting blade 115 in a cross section containing the rotation axis of the cutting tool 110 is of a circular arc.

Figure 3:
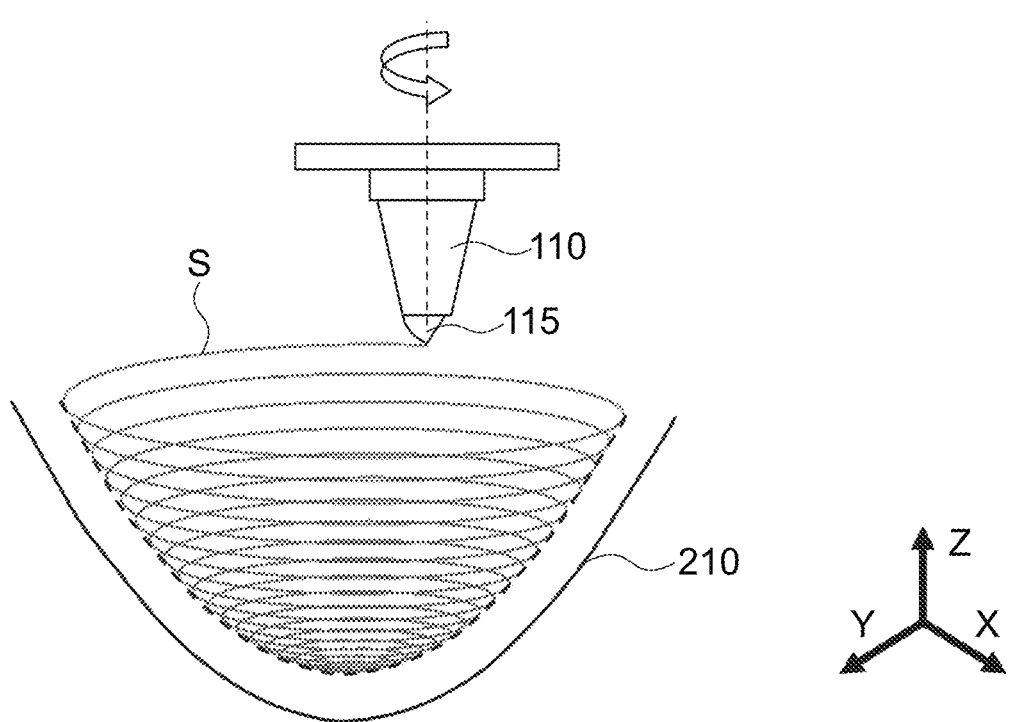
FIG. 3 shows an example of a tool path S of the cutting tool 110 when a surface of a mold, the surface corresponding to a lens surface, is cut by the 5-axis machine.

FIG. 3 shows an example of a tool path S of the cutting tool 110 when a surface 210 of a mold, the surface corresponding to a lens surface, is cut by the 5-axis machine 100. The lens surface and the surface 210 can be spherical, aspherical, of a free-form or the like. The tool path S is a spiral around the central axis of the surface 210 of the mold, for example. In general, cutting should preferably be carried out along a tool path that is continuous and does not intersect with itself. A position of the cutting point of the cutting tool 110 is controlled by the three linear-motion axes (X, Y, Z) of the 5-axis machine 100. How to determine the tool path S will be described later.

Figure 4:
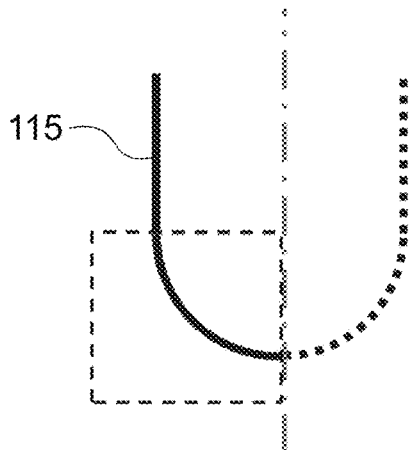
FIG. 4 shows a cross section containing the rotation axis of the cutting tool.
Figure 5:
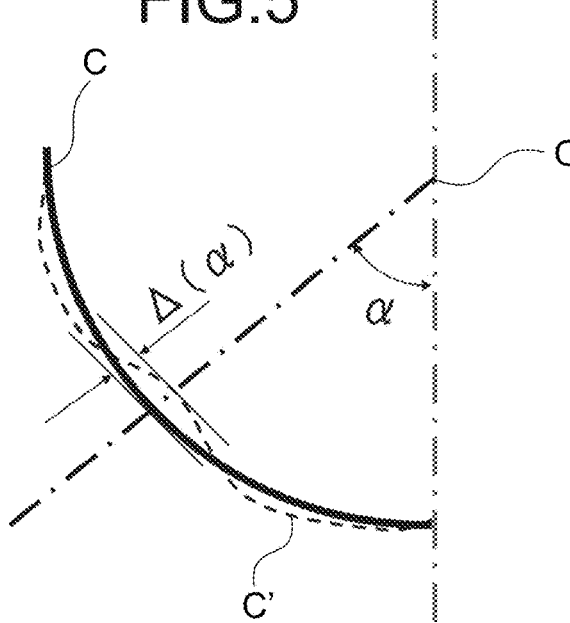
FIG. 5 shows a cross section containing the rotation axis of the cutting tool.

FIGS. 4 and 5 show a cross section containing the rotation axis of the cutting tool 110. FIG. 5 is an enlarged drawing of the portion surrounded with a dashed line in FIG. 4. In the cross section of FIG. 5 a designed circular arc of the contour of the cutting blade 115 is represented by C and the center of the circular arc C is represented by O. The center O is located on the rotation axis. There exists an error arising from a difference in radius between an actual contour C' and the designed circular arc C of the cutting blade 115. The error is caused by the attachment of the cutting tool and waviness of the contour of the cutting blade. Under the situation, an error in radius of the circular arc is determined by a trail cutting and the error is represented as a function $\Delta(\alpha)$ of angle $\alpha$ around the center O of the circular arc C.

The center O of the circular arc C is referred to a reference point. Even when the shape of the cutting blade in the cross section is not an exact circular arc, a position of the cutting point can be determined by an angle around the reference point on the central axis.

Figure 6:
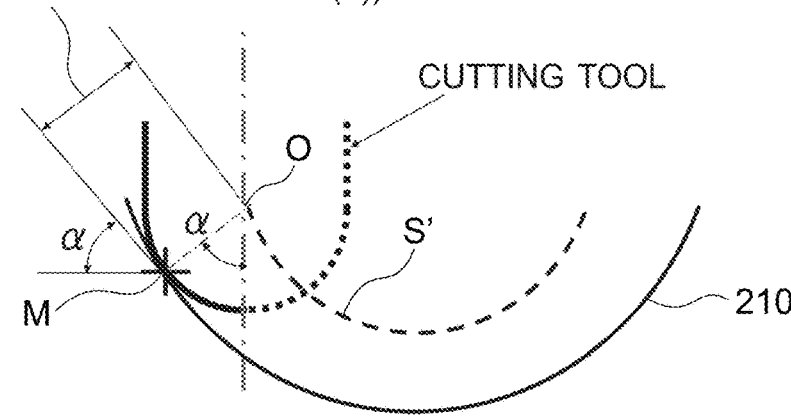
FIG. 6 shows a tool path S' of the center of the circular arc of the cutting blade when a surface of a mold, the surface corresponding to a lens surface, is cut according to a conventional cutting method.

FIG. 6 shows a tool path S' of the center of the circular arc of the cutting blade 115 when a surface 210 of a mold, the surface corresponding to a lens surface, is cut according to a conventional cutting method. FIG. 6 shows a cross section containing the central axis of the surface 210 and the rotation axis of the cutting tool 110. The tool path S' is determined by the radius of the circular arc C and error in radius of the circular arc $\Delta(\alpha)$. The rotation axis of the cutting tool 110 is continuously kept parallel to the central axis of the surface 210, the central axis corresponding to the optical axis of a lens surface. It should be noted that an angle (acute angle) between the straight line connecting the center of the arc C and a position of the cutting point M and the central axis of the cutting tool 110 is equal to an angle (acute angle) $\alpha$ between the tangential line of the contour of the surface 210 at the position of the cutting point M and a straight line perpendicular to the central axis of the surface 210.

Figure 7:
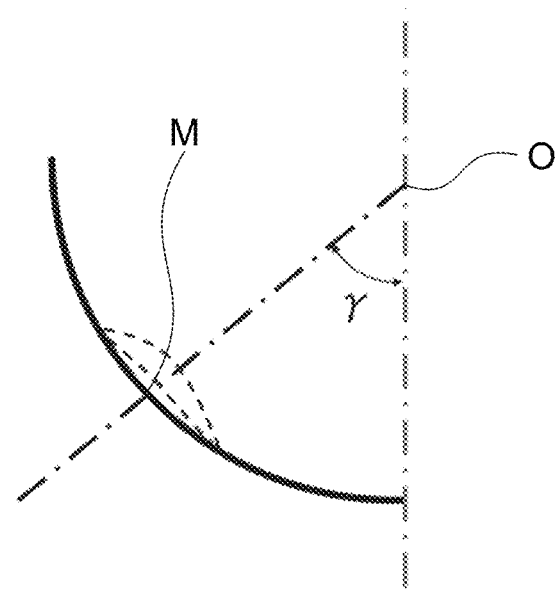
FIG. 7 illustrates wear of the cutting blade.

FIG. 7 illustrates wear of the cutting blade 115. FIG. 7 shows a cross section containing the rotation axis of the cutting tool 110. The maximum value of wear of the cutting blade 115 is observed at the point where an angle (acute angle) between the straight line connecting the center of the arc C and a position of the cutting point M and the central axis of the cutting tool 110 is $\gamma$.

Figure 8:
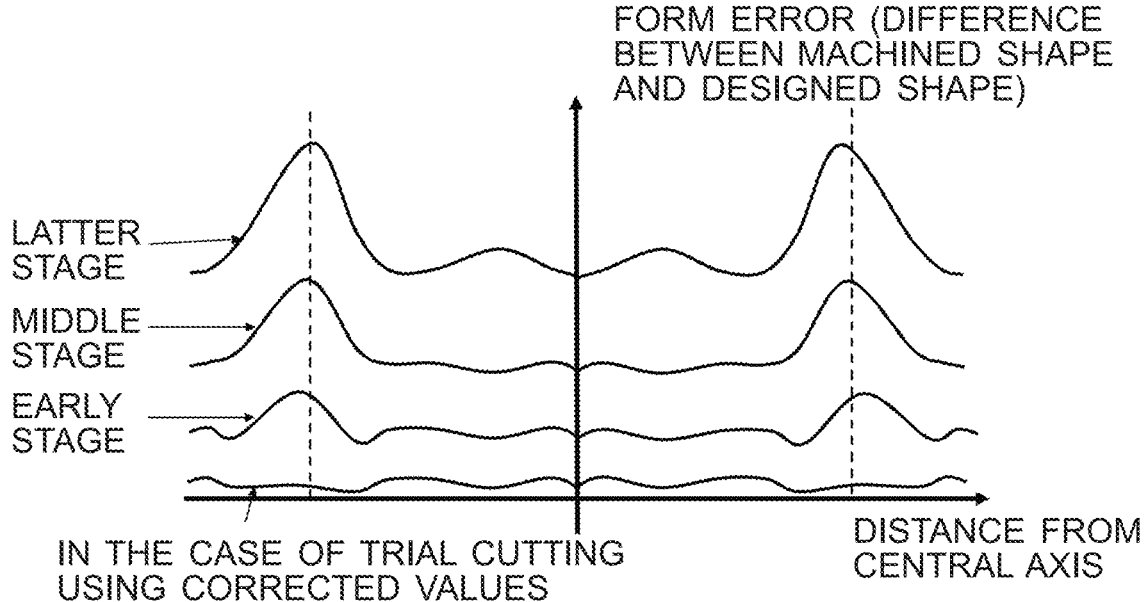
FIG. 8 shows a form error distribution of a surface of a mold, the surface corresponding to a lens surface, caused by wear of the cutting blade.

FIG. 8 shows a form error distribution of a surface 210 of a mold, the surface corresponding to a lens surface, caused by wear of the cutting blade 115. The form error is a difference between the machined shape and the designed shape. The horizontal axis indicates distance of a point on the surface 210 from the central axis and the vertical axis indicates an amount of form errors at the point due to wear of the cutting blade 115. When plural surfaces corresponding to plural surfaces of microlenses are cut using the same cutting tool, form errors of surfaces cut later tend to be greater. As described with FIG. 6, an angle around the center O of the circular arc C is equal to an angle (acute angle) α between the tangential line at the position of the cutting point M of the contour of the surface 210 and a straight line perpendicular to the central axis of the surface 210. Accordingly, the maximum value of form errors is observed at the point at which the angle between the tangential line at the position of the cutting point of the contour of the surface 210 and a straight line perpendicular to the central axis of the surface 210 is equal to the angle (acute angle) γ between the straight line connecting the center of the arc C and the position of the cutting point M and the central axis of the cutting tool 110.

Figure 9:
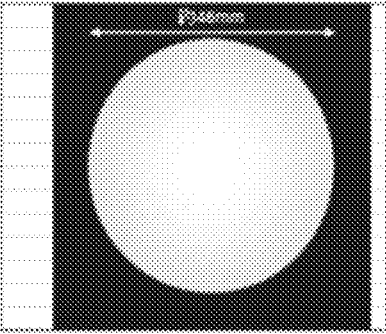
FIG. 9 shows an example of illuminance distribution on a surface illuminated using a microlens array produced using a mold without form errors due to wear of the cutting tool.

FIG. 9 shows an example of illuminance distribution on a surface illuminated using a microlens array produced using a mold without form errors due to wear of the cutting tool.

Figure 10:
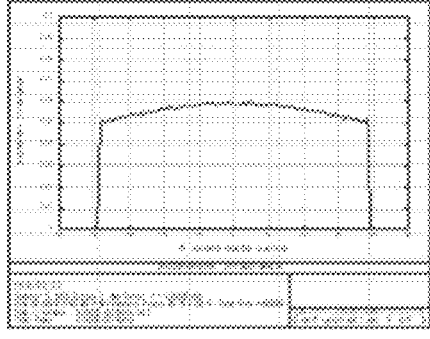
FIG. 10 shows illuminance in a cross section that is in the horizontal direction and contains the center of the circle shown in FIG. 9.

FIG. 10 shows illuminance in a cross section that is in the horizontal direction and contains the center of the circle shown in FIG. 9. The horizontal axis of FIG. 10 indicates position in the horizontal direction and the vertical axis of FIG. 10 indicates relative values of illuminance.

According to FIGS. 9 and 10, illuminance on the illuminated surface is substantially uniform.

Figure 11:
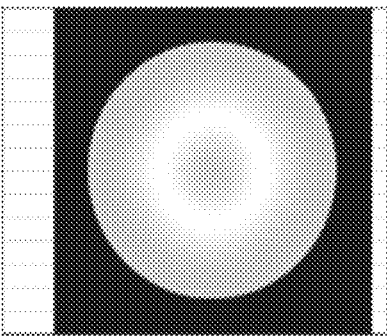
FIG. 11 shows an example of illuminance distribution on a surface illuminated using a microlens array produced using a mold with such a form error distribution as shown in FIG. 8 due to wear of the cutting tool.

FIG. 11 shows an example of illuminance distribution on a surface illuminated using a microlens array produced using a mold with such a form error distribution as shown in FIG. 8 due to wear of the cutting tool.

Figure 12:
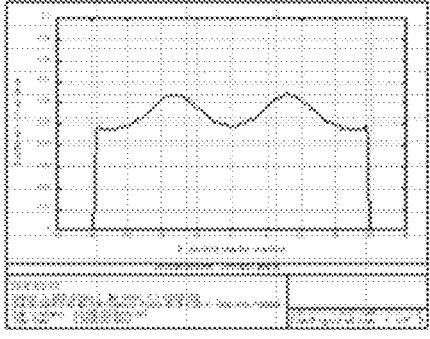
FIG. 12 shows illuminance in a cross section oriented in the horizontal direction and containing the center of the circle of FIG. 11.

FIG. 12 shows illuminance in a cross section oriented in the horizontal direction and containing the center of the circle of FIG. 11. The horizontal axis of FIG. 12 indicates position in the horizontal direction and the vertical axis of FIG. 12 indicates relative values of illuminance.

Since the maximum value of wear of the cutting blade 115 is observed at the point where an angle (acute angle) between the straight line connecting the center of the arc C and the position of the cutting point M and the central axis of the cutting tool 110 is γ, a nearly circular portion in which form errors are relative great appears at a similar location in each of the plural surfaces of a mold corresponding to the plural microlens surfaces. Accordingly, form errors in each of the plural microlens surfaces of a micrlens array produced using the mold are relatively great at similar locations. As a result, a change in illuminance caused by the form errors in each of the plural microlens at the similar locations is accumulated and a change in illuminance at a particular location on a surface illuminated with the microlens array is relatively great as shown in FIGS. 11 and 12.

The inventors have focused attention on that a nearly circular portion in which form errors due to wear of the cutting blade 115 are relative great appears at a similar location in each of the plural surfaces of the mold corresponding to the plural microlens surfaces and consequently a portion in which a change in illuminance is relatively great on a surface illuminated with the microlens array is generated, the portion corresponding to the nearly circular portion in which form errors are relative great. Then the inventors have come up the idea that the change in illuminance on the surface illuminated with the microlens array can be reduced by making the location of a portion in which form errors are relative great vary from one microlens to another.

Figure 13:
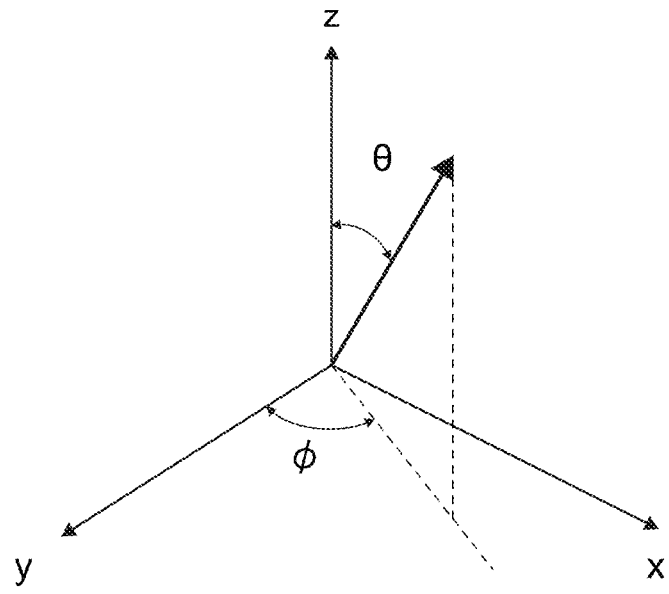
FIG. 13 illustrates inclination of the cutting tool.

FIG. 13 illustrates inclination of the cutting tool 110. A point on the rotation axis of the cutting tool 110 is defined as the origin and a straight line passing through the origin and parallel to the central axis of a surface 210, the central axis corresponding to the optical axis of a microlens surface, is defined as a z-axis. An x-axis and a y-axis that are orthogonal to each other are defined in a plane perpendicular to the z-axis. How to define the x-axis and the y-axis will be described in detail with FIG. 16 later. An angle (acute angle) between the z-axis and the rotation axis of the cutting tool 110 is represented by θ. An angle between the y-axis and the plane containing the z-axis and the rotation axis of the cutting tool 110 is represented by φ.

Figure 14:
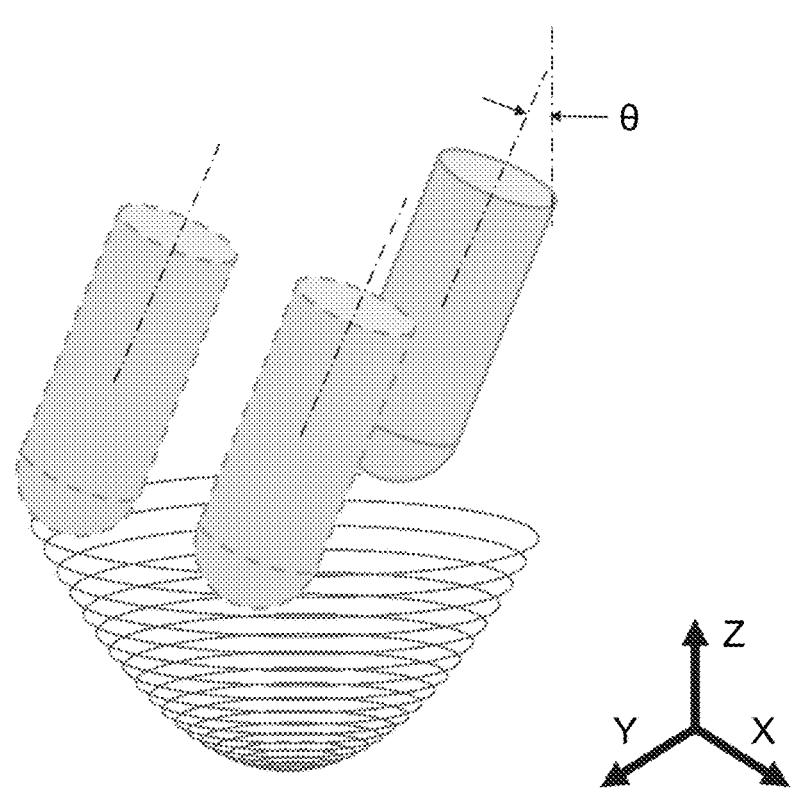
FIG. 14 shows a positional relationship between the cutting tool and the tool path when the angle (acute angle) between the z-axis and the rotation axis of the cutting tool is $\theta$.

FIG. 14 shows a positional relationship between the cutting tool 110 and the tool path when the angle (acute angle) between the z-axis and the rotation axis of the cutting tool 110 is θ. In the conventional method described with FIG. 6 the angle (acute angle) between the z-axis and the rotation axis of the cutting tool 110 is 0.

Figure 15A:
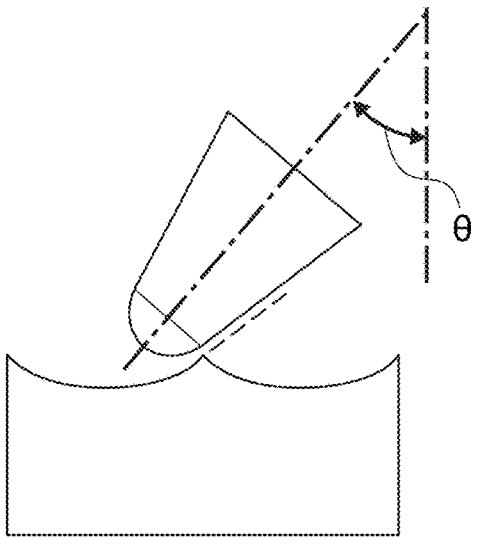
FIG. 15A illustrates how to determine the maximum value of angle (acute angle) $\theta$ between the z-axis and the rotation axis of the cutting tool.

FIG. 15A illustrates how to determine the maximum value of angle (acute angle) θ between the z-axis and the rotation axis of the cutting tool 110. FIG. 15A shows a cross section containing the rotation axis of the cutting tool 110 and the central axis of a surface 210. The maximum value of angle θ is determined such that the side of the cutting tool and the surface 210 do not come into contact with each other.

Figure 15B:
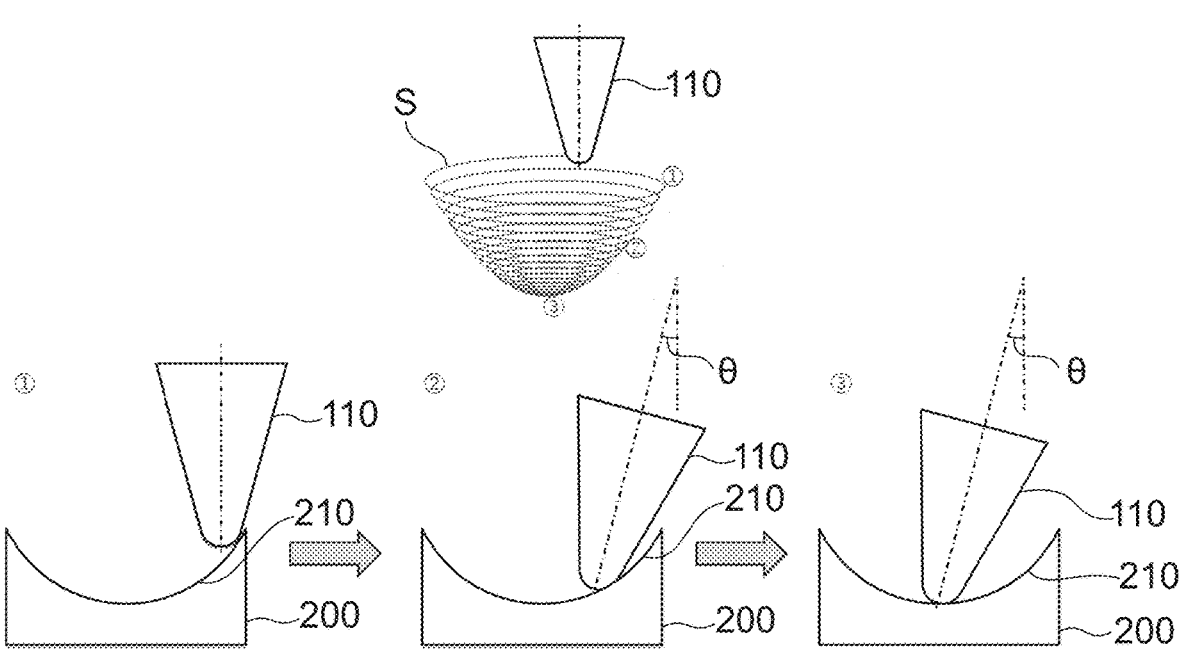
FIG. 15B illustrates a cutting method in which a value of angle $\theta$ is relatively small at the periphery of the surface 210 such that the side of the cutting tool and the surface 210 do not come into contact with each other and then the value of angle $\theta$ is made to increase when cutting is carried out along the tool path S.

FIG. 15B illustrates a cutting method in which a value of angle θ is relatively small at the periphery of the surface 210 such that the side of the cutting tool and the surface 210 do not come into contact with each other and then the value of angle θ is made to increase when cutting is carried out along the tool path S. The cutting method shown in FIG. 15B will be described later.

Figure 16:
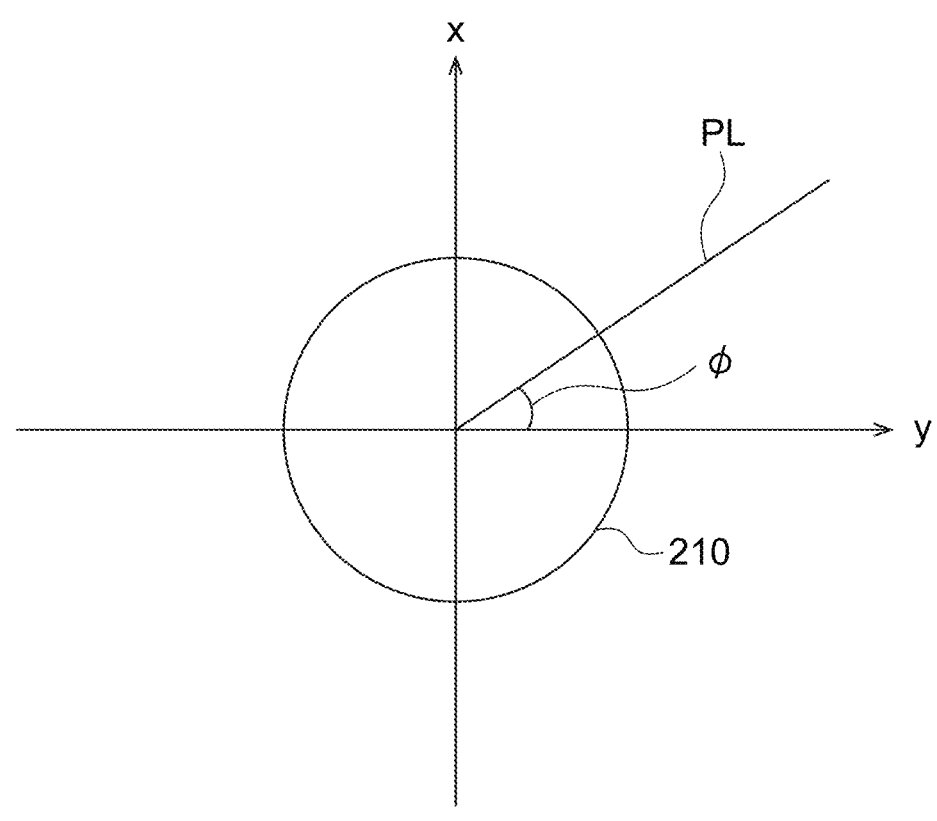
FIG. 16 illustrates how to determine an angle $\phi$ between the y-axis and the plane containing the rotation axis of the cutting tool and a straight line passing through the rotation axis of the cutting tool and parallel to a z-axis.

FIG. 16 illustrates how to determine an angle φ between the y-axis and the plane containing the rotation axis of the cutting tool 110 and a straight line passing through the rotation axis of the cutting tool 110 and parallel to a z-axis. In FIG. 16 the z-axis agrees with the central axis of a surface 210 of the mold, the surface corresponding to a microlens surface. In a plane perpendicular to the z-axis of the surface the x-axis of the surface and the y-axis of the surface are defined. For the plural surfaces of the mold corresponding to the plural microlens surfaces, the x-axis of a surface is parallel to that of any other surface, the y-axis of the surface is parallel to that of any other surface and the z-axis of the surface is parallel to that of any other surface. In FIG. 16 the angle φ is measured counterclockwise with respect to the y-axis. A plane containing the z-axis of the surface and forming angle φ with the plane containing the y-axis and the z-axis of the surface is represented by PL. Each of the x-axis, the y-axis and the z-axis of the cutting tool illustrated in FIG. 13 is defined such as to be parallel to each of the x-axis, the y-axis and the z-axis of the surface. In the conventional cutting method described with FIG. 6 angle φ of the cutting tool is kept constant while a surface 210 corresponding to a microlens surface is cut.

The position at which the maximum value of form errors appears on the surface 210 will be described below. As described with FIG. 8, the position at which the maximum value of form errors appears on the surface 210 is determined by the position on the cutting tool at which an angle (acute angle) between the straight line connecting the center O of the circular arc C and the position of the cutting point M and the rotation axis of the cutting tool 110 is γ. The maximum value of wear of the cutting tool 110 appears at the above-described position.

In cases described below a surface 210 corresponding to a microlens surface is assumed to be spherical. The cross section in FIG. 17 and that in FIG. 18, which will be described below, correspond to a plane PL determined by angle φ as described with FIG. 16.

Figure 17:
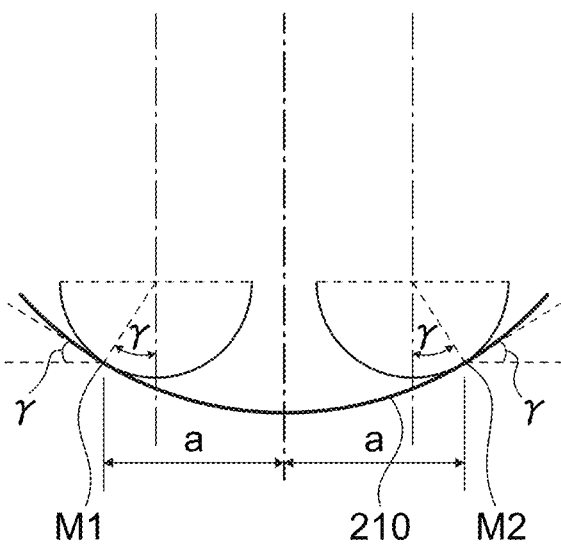
FIG. 17 illustrates the position at which the maximum value of form errors appears on the surface when the angle $\theta$ is zero.

FIG. 17 illustrates the position at which the maximum value of form errors appears on the surface 210 when the angle θ is zero. FIG. 17 shows a cross section containing the central axis of a surface 210 and the rotation axis of the cutting tool 110. The cross section in FIG. 17 is identical with the cross section in FIG. 6. As described with FIG. 6, an angle (acute angle) between the straight line connecting the center of the arc C and the position of the cutting point M and the central axis of the cutting tool 110 is equal to an angle (acute angle) α between the tangential line at the position of the cutting point of the contour of the surface 210 and a straight line perpendicular to the central axis of the surface 210. The positions on the surface 210 that are cut by the position on the cutting tool 110 at which the angle (acute angle) between the straight line connecting the center of the arc C and the position of the cutting point M and the central axis of the cutting tool 110 is γ and the maximum value of wear of the cutting blade 115 appears include the position of the cutting point M1 at which the angle (acute angle) between the tangential line of the contour of the surface 210 and a straight line perpendicular to the central axis of the surface 210 is γ and the position of the cutting point M2 at which the angle (acute angle) between the tangential line of the contour of the surface 210 and a straight line perpendicular to the central axis of the surface 210 is γ. Provided that the surface 210 is spherical, the positions on the surface 210 that are cut by the position with γ of the cutting blade 115 are on a plane containing the positions of the cutting points M1 and M2 and perpendicular to the central axis and on a circle on the surface 210. The center of the circle is on the central axis and the radius of the circle is a.

Figure 18:
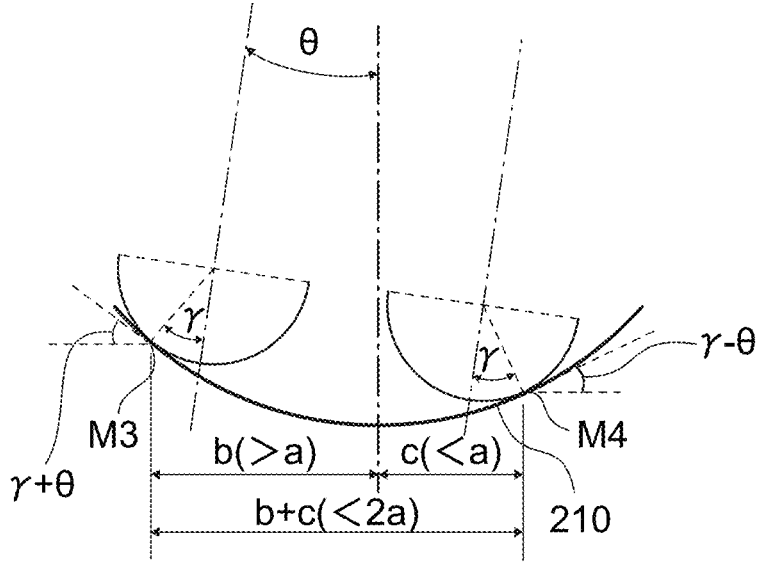
FIG. 18 illustrates the position at which the maximum value of form errors appears on the surface when the angle $\theta$ is a constant that is not zero.

FIG. 18 illustrates the position at which the maximum value of form errors appears on the surface 210 when the angle θ is a constant that is not zero. FIG. 18 shows a cross section containing the central axis of a surface 210 and the rotation axis of the cutting tool 110. In FIG. 18 an inclination of the rotation angle of the cutting tool 110 from the central axis of the surface 210 is θ. Accordingly, the positions on the surface 210 that are cut by the position on the cutting tool 110 at which the angle (acute angle) between the straight line connecting the center of the arc C and the position of the cutting point M and the central axis of the cutting tool 110 is γ and the maximum value of wear of the cutting blade 115 appears include the position of the cutting point M3 at which the angle (acute angle) between the tangential line at the cutting point of the contour of the surface 210 is γ+θ and the position of the cutting point M4 at which the angle (acute angle) between the tangential line at the position of the cutting point of the contour of the surface 210 is γ−θ. When in the cross section of FIG. 18, a distance between the central axis and the position of the cutting point M3 at which the angle is γ+θ is represented by b and a distance between the central axis and the position of the cutting point M4 at which the angle is γ−θ is represented by c, b is greater than a and c is smaller than a. Further, the sum of b and c is smaller than 2a. Provided that the surface 210 is spherical, the positions on the surface 210 that are cut by the position with γ of the cutting blade 115 are on a plane containing the positions of the cutting points M3 and M4 and perpendicular to a straight line at angle θ with respect to the central axis and on a substantially circular shape on the surface 210. A distance between the center of the circular shape and the central axis of the surface 210 increases with angle θ. In other words, the position of a closed curve showing the position at which the maximum value of form errors appears on the surface 210 travels with angle θ from the central axis in the direction determined by angle φ. The amount of travel increases with angle θ.

Figure 19:
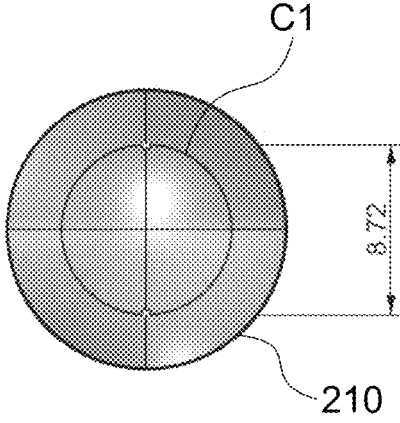
FIG. 19 shows a closed curve C1 showing the position at which the maximum value of form errors appears on the surface when $\theta$ is 0 degree.

FIG. 19 shows a closed curve C1 showing the position at which the maximum value of form errors appears on the surface 210 when θ is 0 degree. The center of the closed curve C1 agrees with the central axis of the surface 210.

Figure 20:
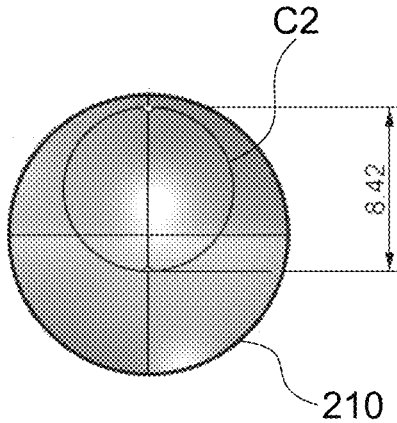
FIG. 20 shows a closed curve C2 showing the position at which the maximum value of form errors appears on the surface when $\theta$ is 15 degrees and $\phi$ is 90 degrees.

FIG. 20 shows a closed curve C2 showing the position at which the maximum value of form errors appears on the surface 210 when θ is 15 degrees and φ is 90 degrees. φ is measured counterclockwise with respect to the horizontal direction. The center of the closed curve C2 travels from the central axis in the direction determined by φ=90 degrees.

Figure 21:
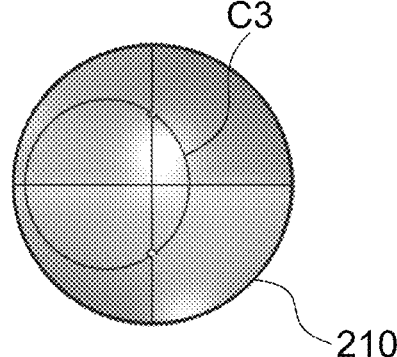
FIG. 21 shows a closed curve C3 showing the position at which the maximum value of form errors appears on the surface when $\theta$ is 15 degrees and $\phi$ is 180 degrees.

FIG. 21 shows a closed curve C3 showing the position at which the maximum value of form errors appears on the surface 210 when θ is 15 degrees and φ is 180 degrees. The center of the closed curve C3 travels from the central axis in the direction determined by φ=180 degrees.

In the cases of FIGS. 19-21 it is assumed that the surface 210 is spherical. C1 is a circle. C2 and C3 are curves that are similar to an ellipse.

In another embodiment, when cutting is carried out along the tool path S shown In FIG. 3, angle φ is set to 90 degrees and angle θ is set to 0 at the periphery of the surface 210, made to increase with decrease in a distance between a position of the cutting point and the central axis of the surface 210 and kept at 15 degrees in the area where a distance between a position of the cutting point and the central axis of the surface 210 is equal to or smaller than 30 percent of the distance the central axis and the periphery of the surface 210. In this case results similar to those of the case shown in FIG. 20 have been obtained. The above-described method is what is illustrated in FIG. 15B and the plane shown in FIG. 15B is the plane of φ=90 degrees that is represented by the straight line in the vertical direction in FIG. 20. In still another embodiment, when cutting is carried out along the tool path S shown In FIG. 3, angle φ is set to 180 degrees and angle θ is set to 0 at the periphery of the surface 210, made to increase with decrease in a distance between a position of the cutting point and the central axis of the surface 210 and kept at 15 degrees in the area where a distance between a position of the cutting point and the central axis of the surface 210 is equal to or smaller than 30 percent of the distance the central axis and the periphery of the surface 210. In this case results similar to those of the case shown in FIG. 20 have been obtained. The above-described method is what is illustrated in FIG. 15B and the plane shown in FIG. 15B is the plane of φ=180 degrees that is represented by the straight line in the horizontal direction in FIG. 20. Thus, by the method shown in FIG. 15B a contact between the side of the cutting tool and the periphery of the surface 210 can be avoided.

In general, a curve showing the position at which the maximum value of form errors appears on the surface 210 can be a curve that is not closed.

As described above, by making at least one of angle θ and angle φ vary from one surface to another among the plural surfaces 210 corresponding to the plural microlens surfaces, the position at which the maximum value of form error appears can be made vary from one surface to another among the plural microlens surfaces. Further, by making at least one of angle θ and angle φ distribute in a certain range among the plural surfaces 210, the position at which the maximum value of form errors appears is made to vary from one surface to another among the plural surfaces 210 and the position at which the maximum value of form error appears of a microlens differs from that of another microlens.

Accordingly, a change in illuminance caused by form errors of the plural microlenses in an illuminance distribution on a surface illuminated using the microlens array can be made smaller.

Making angle distribute in a certain range among the plural surfaces includes making angle uniformly distribute in a certain range, making angle distribute in a certain range according to a probability density function and making angle distribute such that the values of angle are set at regular intervals in a certain range. In general, a variance of values of angle that are made to distribute in a certain range should be made greater than an appropriate value. The appropriate value is determined such that a change in illuminance that appears in an illuminance distribution on a surface illuminated using the microlens array is made sufficiently small.

Examples of illuminance distribution on a surface illuminated using the microlens array that has been produced with a method in which angle $\theta$ and angle $\phi$ are made to vary from one surface to another among the plural surfaces 210 corresponding to the plural microlens surfaces will be obtained by simulation. Angle $\theta$ and angle $\phi$ are made to vary according to the probability density functions shown below.

Figure 22:
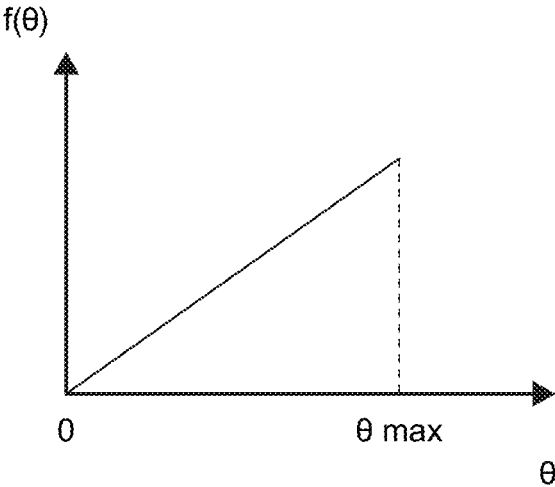
FIG. 22 shows a probability density function $f(\theta)$ of angle $\theta$.

FIG. 22 shows a probability density function $f(\theta)$ of angle $\theta$. $f(\theta)$ can be represented by the following expression.

$$f(\theta) = \frac{2}{\theta_{max}^2} \cdot \theta \qquad (1)$$

The expectation of $\theta$ is two thirds of the maximum value $\theta$max.

Figure 23:
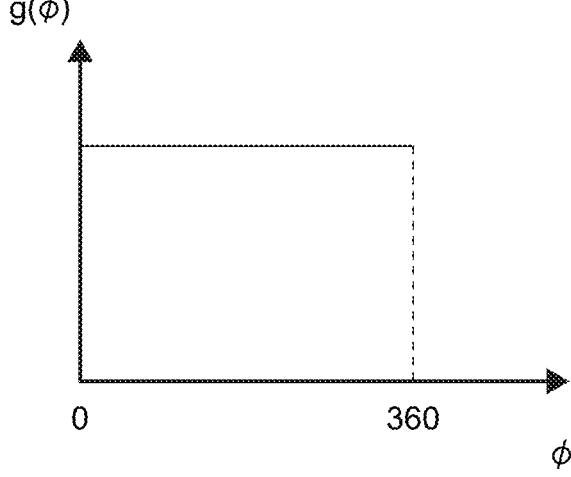
FIG. 23 shows a probability density function $g(\phi)$ of angle $\phi$.

FIG. 23 shows a probability density function $g(\phi)$ of angle $\phi$. $g(\phi)$ can be represented by the following expression.

$$g(\phi) = \frac{1}{360} \qquad (2)$$

In the simulation, $\theta$ and $\phi$ are determined respectively according to $f(\theta)$ and $g(\phi)$ for each of three groups with 6, 20 and 50 microlenses and the position at which the maximum value of form errors appears in each microlens surface is obtained. The maximum value $\theta$max is 10 degrees. Then, an illuminance distribution on a surface illuminated by each microlens is obtained and an average for each group is obtained. An illuminance distribution corresponding to each microlens array is estimated from the average.

Figure 24:
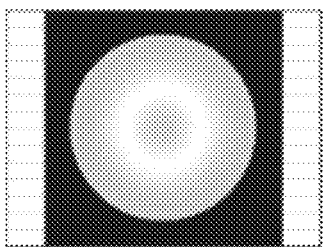
FIG. 24 shows an illuminance distribution on a surface illuminated using a microlens produced using a mold cut by a conventional method in which $\theta=0$.

FIG. 24 shows an illuminance distribution on a surface illuminated using a microlens produced using a mold cut by a conventional method in which $\theta$=0.

Figure 25:
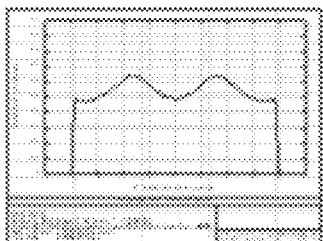
FIG. 25 shows an illuminance distribution in a cross section in the horizontal direction of FIG. 24.

FIG. 25 shows an illuminance distribution in a cross section in the horizontal direction of the illuminance distribution shown in FIG. 24. The horizontal axis of FIG. 25 indicates position in the horizontal direction and the vertical axis of FIG. 25 indicates relative values of illuminance.

Figure 26:
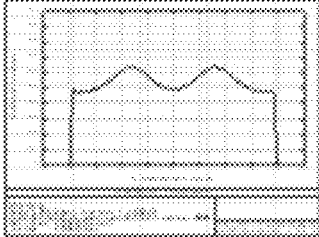
FIG. 26 shows an illuminance distribution in a cross section in the vertical direction of FIG. 24.

FIG. 26 shows an illuminance distribution in a cross section in the vertical direction of FIG. 24. The horizontal axis of FIG. 26 indicates position in the vertical direction and the vertical axis of FIG. 26 indicates relative values of illuminance.

Figure 27:
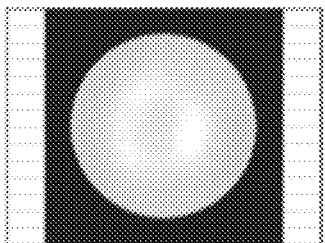
FIG. 27 shows an averaged illuminance distribution of the group with 6 microlenses.

FIG. 27 shows an averaged illuminance distribution of the group with 6 microlenses.

Figure 28:
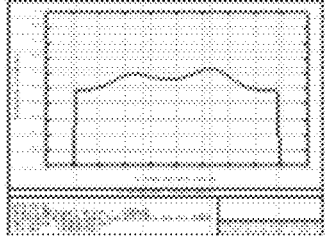
FIG. 28 shows an illuminance distribution in a cross section in the horizontal direction of FIG. 27.

FIG. 28 shows an illuminance distribution in a cross section in the horizontal direction of FIG. 27. The horizontal axis of FIG. 28 indicates position in the horizontal direction and the vertical axis of FIG. 28 indicates relative values of illuminance.

Figure 29:
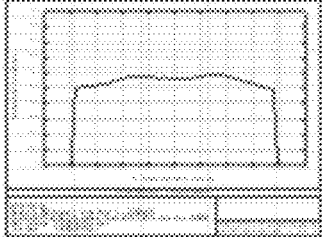
FIG. 29 shows an illuminance distribution in a cross section in the vertical direction of FIG. 27.

FIG. 29 shows an illuminance distribution in a cross section in the vertical direction of FIG. 27. The horizontal axis of FIG. 29 indicates position in the vertical direction and the vertical axis of FIG. 29 indicates relative values of illuminance.

Figure 30:
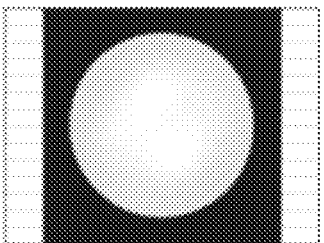
FIG. 30 shows an averaged illuminance distribution of the group with 20 microlenses.

FIG. 30 shows an averaged illuminance distribution of the group with 20 microlenses.

Figure 31:
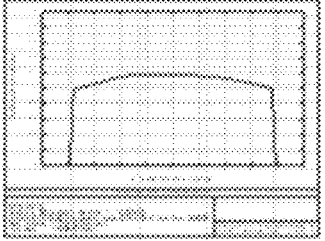

FIG. 31 shows an illuminance distribution in a cross section in the horizontal direction of FIG. 30. The horizontal axis of FIG. 31 indicates position in the horizontal direction and the vertical axis of FIG. 31 indicates relative values of illuminance.

Figure 32:
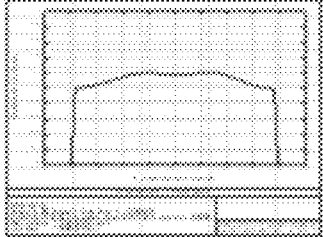
FIG. 32 shows an illuminance distribution in a cross section in the vertical direction of FIG. 30.

FIG. 32 shows an illuminance distribution in a cross section in the vertical direction of FIG. 30. The horizontal axis of FIG. 32 indicates position in the vertical direction and the vertical axis of FIG. 32 indicates relative values of illuminance.

Figure 33:
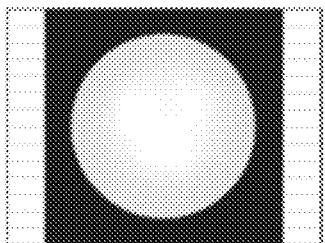
FIG. 33 shows an averaged illuminance distribution of the group with 50 microlenses.

FIG. 33 shows an averaged illuminance distribution of the group with 50 microlenses.

Figure 34:
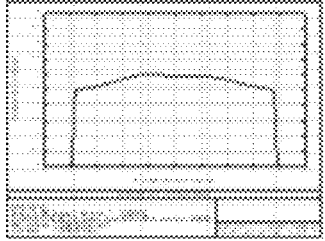
FIG. 34 shows an illuminance distribution in a cross section in the horizontal direction of FIG. 33.

FIG. 34 shows an illuminance distribution in a cross section in the horizontal direction of FIG. 33. The horizontal axis of FIG. 34 indicates position in the horizontal direction and the vertical axis of FIG. 34 indicates relative values of illuminance.

Figure 35:
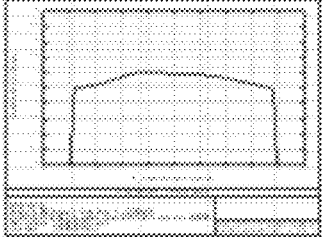
FIG. 35 shows an illuminance distribution in a cross section in the vertical direction of FIG. 33.

FIG. 35 shows an illuminance distribution in a cross section in the vertical direction of FIG. 33. The horizontal axis of FIG. 35 indicates position in the vertical direction and the vertical axis of FIG. 35 indicates relative values of illuminance.

As shown in FIGS. 24-26, when a mold is cut by the conventional method in which $\theta$=0, the position at which the maximum value of form errors appears is not made to vary from one surface to another among the plural microlens surfaces, and therefore a change in illuminance at the position on a surface illuminated using the microlens array will be greater, the position corresponding to the position at which the maximum value of form errors appears on each microlens surface. As shown in FIGS. 27-35, by making the position at which the maximum value of form errors appears vary from one surface to another among the plural microlens surfaces, a change in illuminance on a surface illuminated using the microlens array will be smaller than in the case in which a mold is cut by the conventional method in which $\theta$=0

How to carry out a cutting method according to the present invention using the 5-axis machine 100 shown in FIG. 1 will be described below. Each of the x-axis, y-axis and z-axis shown in FIG. 3 and other drawings can be made to correspond to each of the three linear-motion axes (X, Y, Z) shown in FIG. 1, respectively. Angle $\theta$ and angle $\phi$ can be made to correspond to angle around the rotation axis C and the rotation axis B, respectively.

When angle $\theta$ is made to vary from one microlens to another, x, y, and z coordinates of the cutting-start point vary from one microlens to another and processes of calculation and positioning for cutting become complicated. Further, a tool path (locus) must be calculated for each $\theta$ in consideration of error $\Delta(\alpha)$. Accordingly, it is preferable to make angle $\phi$ alone vary and to keep angle $\theta$ constant in order to avoid the complicated processes.

How to make angle $\phi$ vary among the plural surfaces 210 corresponding to the microlens surfaces of a microlens array will be described below. Angle $\theta$ is assumed to be a constant that is not 0, unless otherwise specified. When angle $\theta$ is 0, angle $\phi$ is angle around the central axis of a surface 210 of the mold, and therefore the position at which the maximum value of form errors appears is not made to vary even if angle $\phi$ is made to vary among the plural surfaces. In order to make the position at which the maximum value of form errors appears vary, angle $\theta$ should preferably be 3 degrees or greater. As described above, the maximum value of angle $\theta$ is determined such that the side of the cutting tool and the surface 210 do not come into contact with each other. More specifically, angle $\theta$ should preferably be 15 degrees or smaller. Further, angle $\theta$ should more preferably be 10 degrees or smaller. The reason is as below. When adjusting rotation runout of the rotation axis of a cutting tool, it is difficult to sufficiently adjust both the runout in the axial direction and the runout in a direction perpendicular to the axial direction in some cases. When angle $\theta$ is relatively small, however roughness of the cut surface can be reduced by focusing adjustment of the runout in the axial direction.

The value obtained by dividing the area of a microlens array that is designed to be illuminated with an incident beam by the effective area of a single microlens is represented by N. In general, when N is 10 or smaller, an appropriate distribution of values of angle can be obtained more easily by setting values of angle uniformly at regular intervals than by using a probability density function or the like.

Figure 36:
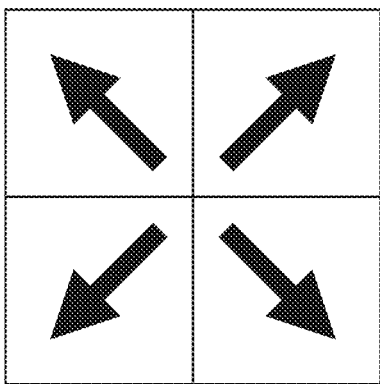
FIG. 36 shows an example of values of angle $\phi$ of surfaces corresponding to four adjacent microlens surfaces in the case of N=4.

FIG. 36 shows an example of values of angle $\phi$ of surfaces corresponding to four adjacent microlens surfaces in the case of N=4. The values of angle $\phi$ of the surfaces corresponding to four adjacent microlens surfaces are set respectively to 45 degrees, 135 degrees, 225 degrees and 315 degrees with respect to the horizontal direction, for example. The interval between the values is 90 degrees. The four arrows in FIG. 36 indicate the four values.

Figure 37:
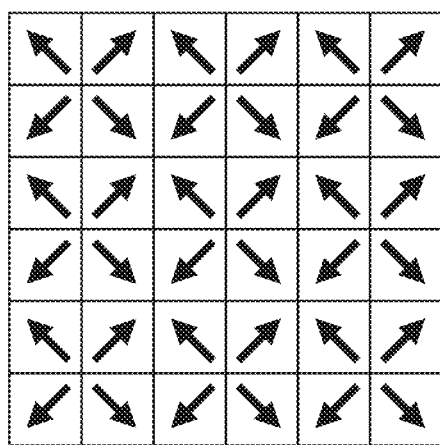
FIG. 37 shows a layout in which sets of the surfaces corresponding to four adjacent microlens surfaces shown in FIG. 36 are combined.

FIG. 37 shows a layout in which sets of the surfaces corresponding to four adjacent microlens surfaces shown in FIG. 36 are combined. According to the layout shown in FIG. 37 in the case of N=4, a distribution of angle $\phi$ is appropriate in an illuminated area of the microlens array for an incident beam at any portion of the microlens array.

Figure 38:
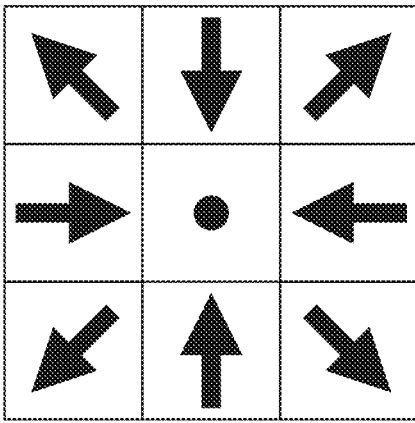
FIG. 38 shows an example of values of angle $\phi$ of surfaces corresponding to nine adjacent microlens surfaces in the case of N=9.

FIG. 38 shows an example of values of angle $\phi$ of surfaces corresponding to nine adjacent microlens surfaces in the case of N=9. The black dot in FIG. 38 means that angle $\theta$ is set to 0.

Figure 39:
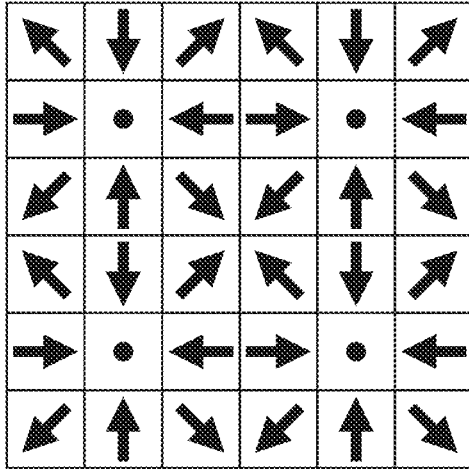
FIG. 39 shows a layout in which sets of the surfaces corresponding to nine adjacent microlens surfaces shown in FIG. 38 are combined.

FIG. 39 shows a layout in which sets of the surfaces corresponding to nine adjacent microlens surfaces shown in FIG. 38 are combined. According to the layout shown in FIG. 38 in the case of N=9, a distribution of angle $\phi$ is appropriate in an illuminated area of the microlens array for an incident beam that has entered any portion of the microlens array.

A variance of values of angle $\phi$ will be described below. For the sake of simplicity, it is assumed that the number of microlenses is six. When values of angle $\phi$ of the surfaces 210 corresponding to all microlens surfaces are 0, the variance of values of angle $\phi$ is 0. When the microlenses are divided into three groups, each group including two microlenses, and values of angle $\phi$ of surfaces 210 corresponding to the two microlenses in each group are 0 and 180 degrees respectively, the variance is 9720. When the microlenses are divided into two groups, each group including three microlenses, and values of angle $\phi$ of surfaces 210 corresponding to the three microlenses in each group are 0, 120 degrees and 240 degrees respectively, the variance is 11520. When the microlenses belong to one group including six microlenses, and values of angle $\phi$ of surfaces 210 corresponding to the six microlenses are 0, 60 degrees, 120 degrees, 180 degrees, 240 degrees and 300 degrees, the variance is 12600. In this case, values of angle $\phi$ of all the surfaces are different from one another. In each group, values of angle are set at regular intervals. The smaller the number of surfaces in which the same value of angle $\phi$ is employed, the greater the variance becomes.

In general, among microlens arrays provided with the same number of microlenses, the greater the variance of values of angle $\phi$ employed for surfaces 210 corresponding to the microlens surfaces of a microlens array, the smaller a change in illuminance distribution on a surface illuminated using the microlens array.

In order to determine values of angle $\phi$ employed for plural surfaces such that the variance is sufficiently great, the values of angle $\phi$ employed for the plural surfaces can be distributed uniformly or can be set at regular intervals as described above. Further, after the plural surfaces have been divided into plural groups each of which includes plural surfaces, the values of angle $\phi$ employed for the plural surfaces in each group can be distributed uniformly or can be set at regular intervals. When the number of the plural surfaces of the microlens array is great, the values of angle $\phi$ employed for the plural surfaces can be determined using pseudo-random number or the like.

Thus, the values of angle $\phi$ employed for the surfaces of a mold are set such that the variance of the values of angle $\phi$ is sufficiently great, a mold is produced using the values of angle $\phi$, a microlens array is produced using the mold and then an illuminance distribution on a surface illuminated using the microlens array is obtained. By evaluating the illuminance distribution, it is determined whether the set values of angle $\phi$ are appropriate or not. If not appropriate, the values of angle $\phi$ employed for the surfaces of a mold are set such that the variance of the values of angle $\phi$ is made greater.

The substantially circular shape in each of FIGS. 19-21 corresponding to the position at which the maximum value of form errors appears on the surface 210 travels around the central axis of the surface 210 with angle $\phi$. Further, a distance between the center of the above-described substantially circular shape and the central axis of the surface 210 increases with angle $\theta$. On the other hand, the radius of the substantially circular shape is determined by the angle (acute angle) $\gamma$ between the straight line connecting the center of the arc C and the position of the cutting point M and the central axis of the cutting tool 110 as described using FIG. 7. When the distance between the center of the above-described substantially circular shape and the central axis of the surface 210 and the radius of the substantially circular shape is equal to each other in the mold, portions in each of which a relatively great change in illuminance is caused by each microlens may overlap with one another on a surface illuminated with the plural microlenses produced by the mold even if angle $\theta$ and angle $\phi$ are made to vary from one surface to another among the plural surfaces corresponding to the plural microlens surfaces.

Figure 40:
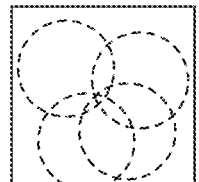
FIG. 40 shows a state in which portions in each of which a relatively great change in illuminance is caused by each microlens overlap with one another in an illuminance distribution generated with the plural microlenses.

FIG. 40 shows a state in which portions in each of which a relatively great change in illuminance is caused by each microlens overlap with one another in a illuminance distribution generated with the plural microlenses.

Accordingly, angle $\theta$ must be determined such as to avoid the state in which portions in each of which a relatively great change in illuminance is caused by each microlens overlap with one another in an illuminance distribution generated with the plural microlenses.

Figure 41:
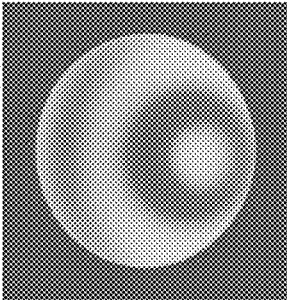
FIG. 41 shows an illuminance distribution generated with a microlens surface corresponding to a surface 210 cut with $\theta$=10 degrees and $\phi$=0.

FIG. 41 shows an illuminance distribution generated with a microlens surface corresponding to a surface 210 cut with $\theta=10$ degrees and $\phi=0$.

Figure 42:
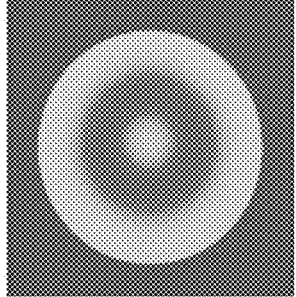
FIG. 42 shows an illuminance distribution generated with a microlens surface corresponding to a surface 210 cut with $\theta$=0.

FIG. 42 shows an illuminance distribution generated with a microlens surface corresponding to a surface 210 cut with $\theta=0$.

Figure 43:
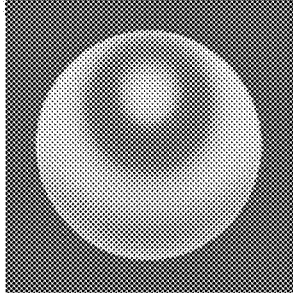
FIG. 43 shows an illuminance distribution generated with a microlens surface corresponding to a surface 210 cut with $\theta$=10 degrees and $\phi$=90 degrees.

FIG. 43 shows an illuminance distribution generated with a microlens surface corresponding to a surface 210 cut with $\theta=10$ degrees and $\phi=90$ degrees.

Figure 44:
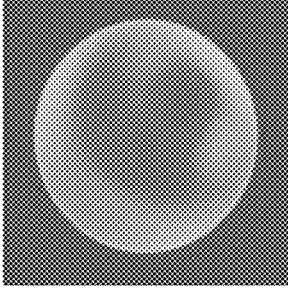
FIG. 44 shows an illuminance distribution obtained by averaging illuminance distributions of FIGS. 41-43.

FIG. 44 shows an illuminance distribution obtained by averaging illuminance distributions of FIGS. 41-43. A change in illuminance in the averaged illuminance distribution of FIG. 44 is smaller than a change in illuminance in each of illuminance distributions of FIGS. 41-43.

Figure 45:
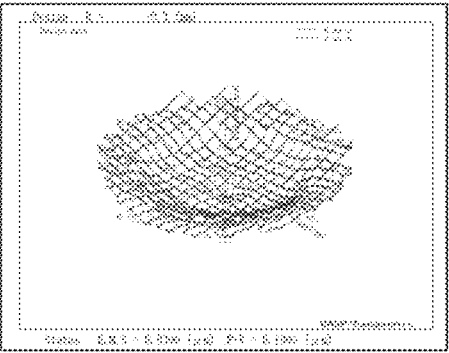
FIG. 45 shows a form error distribution on one of two surfaces of a mold for a microlens array, the two surfaces being cut by a conventional cutting method and corresponding to two microlens surfaces.
Figure 46:
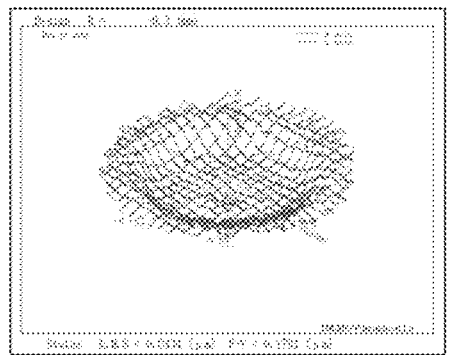
FIG. 46 shows a form error distribution on the other of the two surfaces of the mold for the microlens array.

Each of FIG. 45 and FIG. 46 shows a form error distribution on each of two surfaces of a mold for a microlens array, the two surfaces being cut by a conventional cutting method and corresponding to two microlens surfaces.

Figure 47:
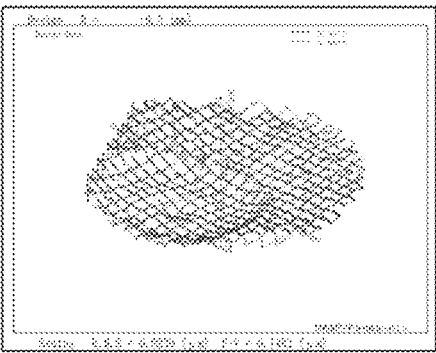
FIG. 47 shows a form error distribution on one of two surfaces of a mold for a microlens array, the two surfaces being cut by a cutting method according to the present invention and corresponding to two microlens surfaces.
Figure 48:
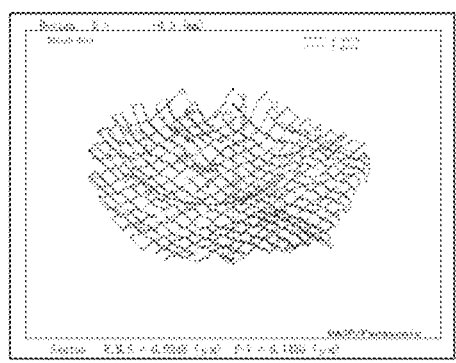
FIG. 48 shows a form error distribution on the other of the two surfaces of the mold for the microlens array.

Each of FIG. 47 and FIG. 48 shows a form error distribution on each of two surfaces of a mold for a microlens array, the two surfaces being cut by a cutting method according to the present invention and corresponding to two microlens surfaces. More detailed information of the cutting method will be given in an example described below.

According to FIGS. 45 and 46, a relatively great value of form errors appears at a similar position in each of the two surfaces corresponding to the two microlenses. On the other hand, according to FIGS. 47 and 48, a relatively great value of form errors appears at a quite different position in each of the two surfaces corresponding to the two microlenses.

An example will be described below. Specifications of a microlens array are given below.

Shape of the Microlens

A spherical surface with radius of 0.3 millimeters

Effective Diameter of the Microlens 0.3 millimeters

Arrangement of Microlenses

Base of a regular hexagonal shape inscribed in a circle with the diameter of the effective lens diameter, the regular hexagonal shape being arranged without a gap therebetween (the area of the base being 0.0585 square millimeters)

Number of Microlenses

418

Positions of optical axes and bases of plural microlenses are adjusted according to the method disclosed in WO2015/182619 of the applicant in order to reduce unevenness of luminous intensity including that caused by diffraction of each microlens aperture.

The radius of the circular arc of the cutting tool used to cut surfaces 210 is 0.2 millimeters. In general, the radius of the circular arc of a cutting tool should preferably be 0.7 times as great as the minimum value of the radius of curvature of a lens or greater and 0.8 times as great as the minimum value of the radius of curvature of a lens or smaller.

Figure 49:
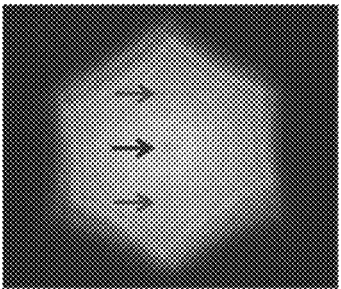
FIG. 49 shows an illuminance distribution on a surface illuminated using a microlens array of the specifications described above produced by a mold produced with a conventional cutting method.

FIG. 49 shows an illuminance distribution on a surface illuminated using a microlens array of the specifications described above produced by a mold produced with a conventional cutting method. The diameter of an incident beam is 1 millimeter.

Figure 50:
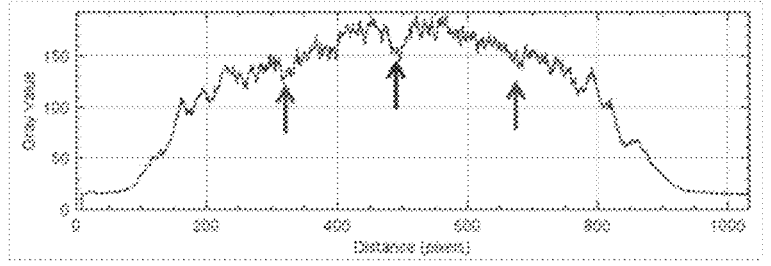
FIG. 50 shows an illuminance distribution in a cross section of FIG. 49.

FIG. 50 shows an illuminance distribution in a cross section of FIG. 49.

Figure 51:
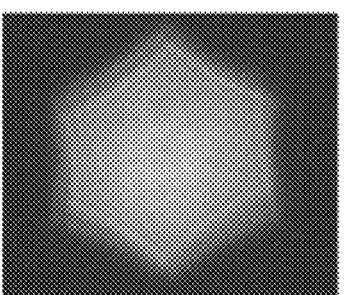
FIG. 51 shows an illuminance distribution on a surface illuminated using a microlens array of the specifications described above produced by a mold produced with a cutting method according to the present invention.

FIG. 51 shows an illuminance distribution on a surface illuminated using a microlens array of the specifications described above produced by a mold produced with a cutting method according to the present invention. The diameter of an incident beam is 1 millimeter.

Figure 52:
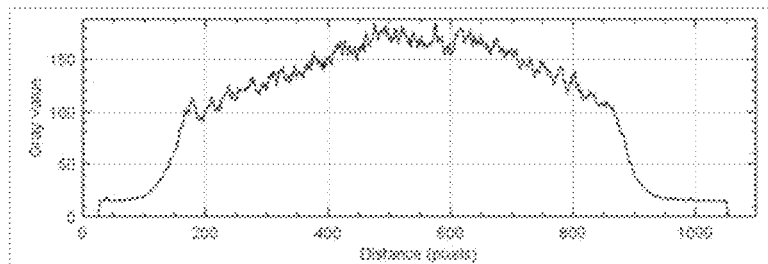
FIG. 52 shows an illuminance distribution in a cross section of FIG. 52.

FIG. 52 shows an illuminance distribution in a cross section FIG. 50.

When observing FIGS. 49 and 50, there exist spots at which illuminance is relatively low, the spots being marked with arrows, in an illuminance distribution on a surface illuminated using a microlens array of the specifications described above produced by a mold produced with a conventional cutting method. On the other hand, when observing FIGS. 51 and 52, there do not exist spots at which illuminance is relatively low in an illuminance distribution on a surface illuminated using a microlens array of the specifications described above produced by a mold produced with a cutting method according to the present invention.

What is claimed is:

1. A method of producing a mold for a microlens array provided with plural microlenses through cutting with a cutting tool that rotates around a rotation axis, wherein the plural microlenses have optical axes in the same direction and the substantially same shapes and the mold has plural surfaces corresponding to surfaces of the plural microlenses, the method comprising:

cutting a surface of the mold, the surface corresponding to a microlens surface and having the central axis corresponding to the optical axis of the microlens, while each of a value of angle $\theta$ between the rotation axis of the cutting tool and a straight line passing through a point on the rotation axis and parallel to the central axis of the surface and a value of angle $\phi$ between a plane containing the rotation axis of the cutting tool and the straight line passing through a point on the rotation axis and parallel to the central axis of the surface and a reference direction perpendicular to the straight line passing through a point on the rotation axis and parallel to the central axis of the surface is kept constant; and cutting the plural surfaces of the mold corresponding to the plural microlens surfaces while the values of angle $\theta$ and angle $\phi$ for the plural surfaces of the mold are determined such that a variance of the values of at least one of angle $\theta$ and angle $\phi$ for the plural surfaces of the mold is greater than a predetermined value to sufficiently reduce a change in illuminance on a surface illuminated using a microlens array produced using the mold.

2. The method of producing a mold for a microlens array according to claim 1, wherein cutting is carried out along a tool path that is continuous and does not intersect with itself.

3. The method of producing a mold for a microlens array according to claim 1, wherein in the cutting the plural surfaces of the mold corresponding to the plural microlens surfaces, the values of angle $\theta$ for the plural surfaces of the mold are set to a constant that is not zero or to plural constants that include at least one constant that is not zero and the values of angle $\phi$ for the plural surfaces of the mold are distributed such that a variance of the values is greater than a predetermined value.

4. The method of producing a mold for a microlens array according to claim 1, wherein the values of at least one of angle $\theta$ and angle $\phi$ for N adjacent surfaces of the mold corresponding to N adjacent microlens surfaces are distributed such that a variance of the values is greater than a predetermined value where N is a natural number equal to or smaller than 10.

5. The method of producing a mold for a microlens array according to claim 1, wherein the value of angle $\theta$ is equal to or greater than 3 degrees and equal to or smaller than 15 degrees.

6. The method of producing a mold for a microlens array according to claim 1, wherein a five-axis machine provided with three linear-motion axes and two rotation axes is employed for cutting, the cutting tool is made to travel by the three linear-motion axes and angle $\theta$ and angle $\varphi$ are determined by the two rotation axes.

7. The method of producing a mold for a microlens array according to claim 1, wherein in the cutting the plural surfaces of the mold corresponding to the plural microlens surfaces, the values of at least one of angle $\theta$ and angle $\varphi$ for the plural surfaces of the mold are distributed uniformly in a certain range or in respective certain ranges.

8. The method of producing a mold for a microlens array according to claim 1, wherein in the cutting a surface of the mold, the value of angle $\theta$ is kept constant in the area where a distance between a position of the cutting point and the central axis of the surface is equal to or smaller than 30 percent of the distance the central axis and the periphery of the surface and the value of angle $\theta$ is smaller than the constant value at the periphery of the surface.

9. A method of producing a microlens array using a mold produced by the method according to claim 1.

\* \* \* \* \*